US012468746B2

(12) United States Patent
Maharaj et al.

(10) Patent No.: US 12,468,746 B2
(45) Date of Patent: Nov. 11, 2025

(54) ENHANCING ARTIFICIAL INTELLIGENCE RESPONSES WITH CONTEXTUAL USAGE INSIGHTS

(71) Applicant: Adobe Inc., San Jose, CA (US)

(72) Inventors: Akash Vivek Maharaj, Palo Alto, CA (US); Vaishnavi Muppala, San Jose, CA (US); Shivakumar Vaithyanathan, San Jose, CA (US); Manas Garg, Fremont, CA (US); Kenneth George Russell, Mountain View, CA (US); Ishita Dasgupta, South San Francisco, CA (US); Anup Bandigadi Rao, San Jose, CA (US); Aleksander Pejcic, Lafayette, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/626,551

(22) Filed: Apr. 4, 2024

(65) Prior Publication Data
US 2025/0315460 A1 Oct. 9, 2025

(51) Int. Cl.
G06F 16/33 (2025.01)
G06F 16/3332 (2025.01)
G06F 16/338 (2019.01)
G06F 16/35 (2025.01)
G06F 16/353 (2025.01)
H04L 67/50 (2022.01)

(52) U.S. Cl.
CPC ........ *G06F 16/3338* (2019.01); *G06F 16/338* (2019.01); *G06F 16/353* (2019.01); *H04L 67/535* (2022.05)

(58) Field of Classification Search
CPC .. G06F 16/3338; G06F 16/338; G06F 16/353; H04L 67/535
See application file for complete search history.

(56) References Cited

U.S. PATENT DOCUMENTS

| 9,785,715 | B1* | 10/2017 | Busey | G06Q 50/01 |
| 10,262,062 | B2* | 4/2019 | Chang | G06F 16/3329 |
| 11,379,487 | B2* | 7/2022 | Cheng | G06N 5/04 |
| 11,531,858 | B2* | 12/2022 | Khabiri | G06F 16/24522 |
| 11,556,716 | B2* | 1/2023 | Fan | G06N 5/04 |

(Continued)

*Primary Examiner* — Debbie M Le
(74) *Attorney, Agent, or Firm* — Shook Hardy & Bacon L.L.P.

(57) ABSTRACT

Some aspects relate to technologies for an artificial intelligent (AI) system that, among other things, enhances responses to concepts questions for an application with contextual usage insights. In accordance with some aspects, a user query is determined to comprise a concepts question regarding an application. Responsive to determining the user query comprises the concepts question, documentation regarding the application relevant to the user query is identified. A generative model generates text for a response to the concepts question using the documentation regarding the application. Additionally, a determination is made to add contextual usage insights to the response. Responsive to determining to add contextual usage insights to the response, usage data relevant to the user query and/or the response is retrieved. The generative model generates text for a final response using the response and the usage data, and the final response is provided to a user device for presentation.

20 Claims, 6 Drawing Sheets

(56) References Cited

U.S. PATENT DOCUMENTS

| | | | |
|---|---|---|---|
| 11,651,250 B2 * | 5/2023 | Mallette | G06F 16/3329 |
| | | | 706/12 |
| 11,977,591 B2 * | 5/2024 | Narang | G06F 16/9535 |
| 12,130,847 B2 * | 10/2024 | Koneru | G06F 9/453 |
| 2024/0267344 A1 * | 8/2024 | Mulligan | H04L 51/214 |
| 2024/0412226 A1 * | 12/2024 | Mathur | G06F 9/453 |

\* cited by examiner

ENHANCING ARTIFICIAL INTELLIGENCE RESPONSES WITH CONTEXTUAL USAGE INSIGHTS

BACKGROUND

Software applications offer a diverse array of features tailored to meet the needs of users across different domains. These features encompass functionalities ranging from basic operations to advanced capabilities, enhancing user experience and productivity. To aid users in navigating through these features effectively, documentation regarding the applications is often available. This documentation serves as a resource, elucidating the purpose, usage, and intricacies of each feature within the applications. Through user manuals, online guides, tutorials, tooltips, and the like, application documentation equips users with knowledge to more fully leverage the applications.

SUMMARY

Some aspects of the present technology relate to, among other things, an artificial intelligence (AI) assistant system that generates responses to user queries regarding an application using documentation describing features of the application and usage data generated through use of the application. In accordance with some aspects, a user query is received by the AI assistant system. The user query is analyzed to determine a type of user question posed by the user query and processed with a corresponding pipeline to generate a response. In some aspects, the user query could comprise: a usage data question asking for certain usage data generated through use of the application, a concepts question asking for information regarding features of the application, or an out of scope question that does not ask for usage data or information regarding the application.

In instances in which the user query is determined to be a concepts question, the user query is processed by a concepts question pipeline of the AI assistant system. The concepts question pipeline leverages a generative model to generate text of a response to the concepts question using documentation describing the application. In some aspects, semantic similarity is used to retrieve, from a corpus of application documentation, documentation that is relevant to the user query, and the retrieved documentation is provided with the user query to the generative model for generating the response to the concepts question.

The AI assistant system also determines whether to add contextual usage data to the response. Contextual usage data comprises usage data that is helpful to provide context to the response to the concepts question generated from the application documentation. A usage insights pipeline determines usage data relevant to the user query and/or the response generated from the application documentation, queries a usage data store for that usage data, and leverages a generative model to generate text with the usage data to provide contextual usage insights. A final response is generated with the response to the concepts question and the contextual usage insights. The final response is provided to a user device for presentation as a response to the user query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
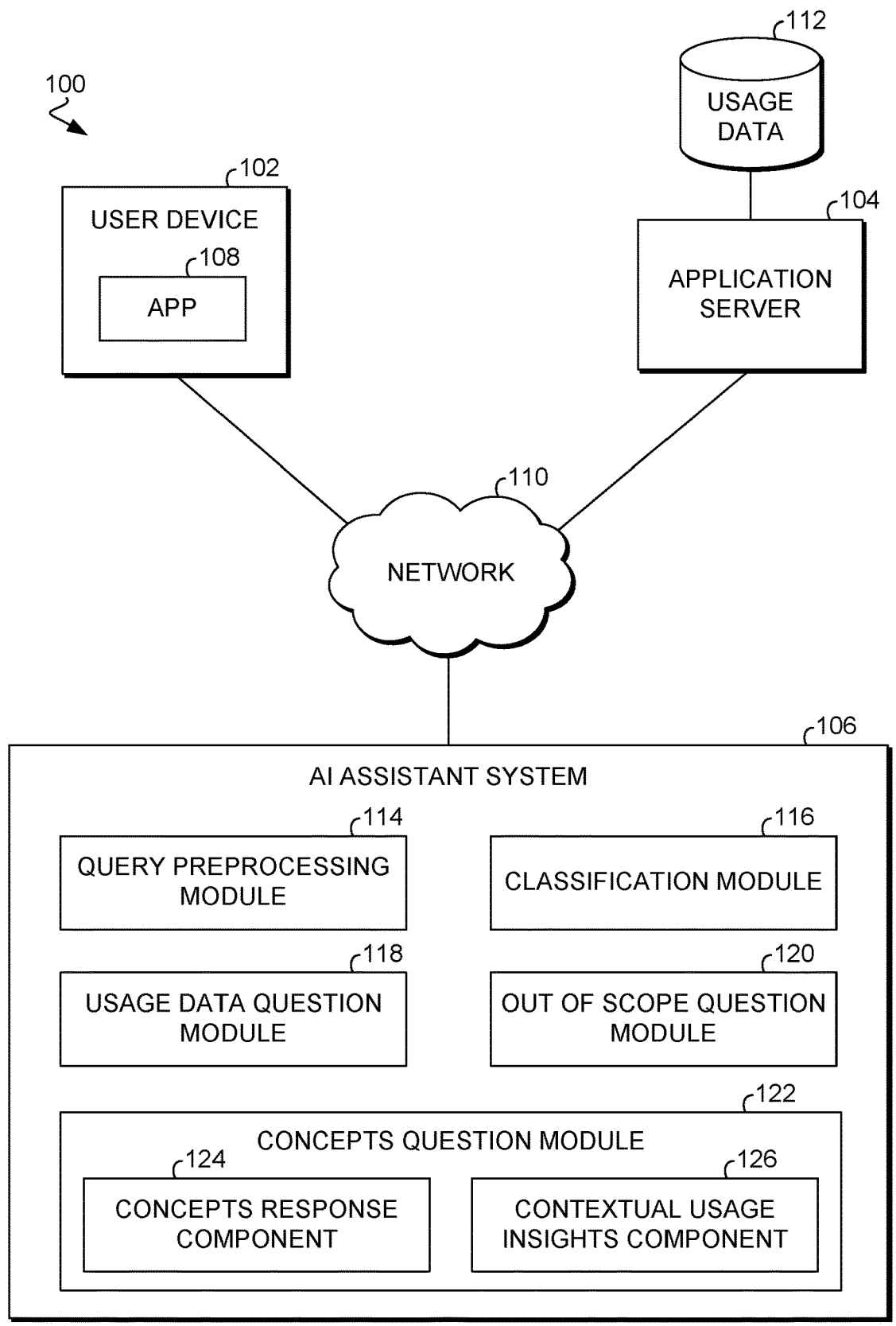
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, an "AI assistant" or "AI assistant system" refers to a computer-based system designed to generate responses to user queries through natural language interaction. An AI assistant can leverage artificial intelligence and machine learning algorithms to understand user queries, interpret context, and generate responses by accessing relevant information from various sources. In accordance with aspects of the technology described herein, an AI assistant generates responses to user queries regarding an application by leveraging usage data and/or application documentation for the application.

"Usage data" is used herein to refer to data collected through use of an application. It can include various information and metrics regarding user interactions with an application, such as, for instance, data pertaining to how enterprise users have utilized enterprise software. For example, when they create a segment, that segment "definition" is a piece of data maintained in servers/databases for the application. Similar usage data can be collected for other objects, such as schemas, sources, destinations, etc. As an example to illustrate in the context of web traffic monitoring, usage data may include the number of page views, unique visitors, session durations, referral sources, and popular content accessed on a website.

As used herein, "application documentation" or "documentation" is used to refer to information describing aspects of an application to support use, maintenance, or general understanding of the application. For instance, application documentation could include user manuals/guides, online help documentation, API documentation, technical documentation, release/version notes, community forums and support channels, knowledge bases, and training materials.

A "usage data question" refers to a user query in which a user is seeking to access particular usage data for an application. For example, a user could issue a user query such as: "how many page views were there on my website yesterday by males aged 30-40?" In accordance with some aspects of the technology described herein, a usage data response to a usage data question is generated using usage data generated for an application.

A "concepts question" refers to a user query in which a user is seeking general information regarding an application. For example, a user could issue a user query such as: "what is the difference between batch and streaming segmentation?" In accordance with some aspects of the technology described herein, a concepts response to a concepts question regarding an application is generated using documentation for the application.

An "out of scope question" refers to a user query that does not fall within the scope of a known type of user query, such as a usage data question or a concepts question.

"Contextual usage insights" is used herein to refer to usage data that is retrieved and added to a response to a concepts question to facilitate an understanding of the response.

Overview

While documentation for applications is undoubtedly valuable, users often encounter challenges when attempting to sift through extensive documentation to find answers. The sheer volume of information coupled with the need to interpret technical jargon can lead to frustration and inefficiency. However, advancements in conversational artificial intelligence (AI) have provided one way to address this issue. With the development of conversational AI assistants, users can ask natural language questions regarding applications and receive responses based on the documentation. These AI assistants leverage natural language processing (NLP) and machine learning algorithms to understand user queries, extract relevant information from documentation, and provide answers in real-time.

However, use of conversational AI assistants to answer application-related questions has essentially become a commoditized feature. In some cases, instead of using an in-house AI assistant, users could instead go directly to a general AI assistant, such as ChatGPT, to answer concepts questions. While the answers from AI assistants can be good enough, in some cases, the responses insufficiently answer the user questions. For instance, responses from currently-available AI assistants can be outdated, may be hard-to-fact check (i.e., hard to ensure the response from the AI assistant doesn't include any hallucinations), or may not clearly and adequately answer the user questions.

These shortcomings in existing AI assistant systems often result in the consumption of an unnecessary quantity of computing resources (e.g., I/O costs, network packet generation costs, throughput, memory consumption, etc.). For instance, if an AI assistant's response to a user query is insufficient, the user may need to submit additional queries to the AI assistant. In some instances, users may need to resort to searching the application documentation to find the information being sought when the AI assistant fails to provide adequate answers. These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocols. Accordingly, when this functionality is multiplied by all the inputs needed to obtain the desired data, there are throughput and latency costs by repetitively generating this metadata and sending it over a computer network. In some instances, these repetitive inputs (e.g., user queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. This decreases throughput and increases network latency.

Aspects of the technology described herein improve the functioning of the computer itself in light of these shortcomings in existing technologies by providing a solution in which an AI assistant system not only answers a user's concepts question, but also provides contextual usage insights based on usage data generated from use of the application, thereby providing relevant context about how the application is being used. For example, suppose a user submits a concepts question to the AI assistant, such as "What is the difference between batch and streaming segmentation?" Aspects of the technology described herein generate a response to the user question by not only providing a technical answer based on application documentation, but also includes contextual usage data, such as stating how many batch and streaming segments have already been created in their usage data and some examples of each. These contextual usage insights provide valuable context to a user, helping ground the response in how the application is being used.

In accordance with some aspects of the present technology, when a user query is received, one or more query preprocessing operations may be performed, such as merging chat history from the current chat session with the user query and/or performing any number of query expansion operations (e.g., acronym expansion, synonym expansion, etc.). The user query may then be classified (e.g., by a classification model) as a particular type of user question and routed to an appropriate pipeline based on the type of user question presented. In some aspects, the AI assistant system can be configured to handle a number of different types of user questions. These may include, for instance, usage data questions in which users are seeking particular usage data for an application, concepts questions in which users are seeking general information regarding an application, and out of scope questions that does not fall within the scope of a known type of user query, such as a usage data question or a concepts question.

In the case of a concepts question, a concepts question pipeline processes the user query to generate a response based on application documentation. The concepts question pipeline uses a generative model to generate text to answer the concepts question using application documentation. In some aspects, documentation relevant to the user query is determined (e.g., using semantic similarity) from a corpus of documentation available for the application, and the retrieved documentation is provided to the generative model to generate the response to the concepts question. Source attribution can also be performed that identifies source documentation used to generate the response.

A determination is also made whether to add contextual usage insights to the response generated using the application documentation. In some configurations, a rules-based approach could be used to determine if the user query or the generated response contains known data objects for which usage data can be retrieved. In some aspects, the determination may also take into account whether a previous response during the chat session has already provided the contextual usage insights. When it is determined to add contextual usage insights to the concepts answer, a usage insights pipeline determines usage data is retrieved that is relevant to the user query and/or the response to the concepts question. A generative model then generates text with the retrieved usage data to generate contextual usage insights, which are merged with the response to the concepts question to generate a final response to the user query.

Aspects of the technology described herein provide a number of improvements over existing technologies. For instance, the technology described herein provides an AI assistant system that generates responses that enable enhanced user understanding. By integrating contextual usage insights into responses to concepts question, the AI assistant doesn't just provide textbook answers based on application documentation but offers responses based on data regarding actual usage of the application. This deepens the user's understanding, providing them with insights they might not even have realized they needed. As a result, an AI assistant system using the technology described herein provides improved computing resource consumption relative to existing technologies. For instance, aspects of the technology described herein eliminate (or at least reduce) the repetitive user queries relative to conventional techniques because the generated responses are more likely to fully address the user queries. Accordingly, aspects of the technology described herein decrease computing resource consumption, such as packet generation costs. For instance, a user query would only need to traverse a computer network once (or fewer times relative to existing technologies). Specifically, the contents or payload of the user query is supplemented with header information or other metadata within a packet in TCP/IP and other protocols once for the initial user query. A user query is only sent over the network once or fewer times. Thus, there is no repetitive generation of metadata and continuous sending of packets over a computer network. In like manner, aspects of the technology described herein improve storage device or disk I/O and query execution functionality, as they only need to go out to disk a single time (or fewer times relative to existing technologies). As described above, the inadequacy of existing approaches results in repetitive user queries, which causes multiple traversals to disk. In contrast, aspects described herein reduce storage device I/O because the user provides only minimal inputs and so the computing system does not have to reach out to the storage device as often to perform a read or write operation. Accordingly, there is not as much wear on components, such as a read/write head, because disk I/O is substantially reduced.

Example System for Enhancing AI Responses with Contextual Usage Insights

With reference now to the drawings, FIG. 1 is a block diagram illustrating an exemplary system 100 providing an AI assistant that generates responses to application-related user queries in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, an application server 104, and an AI assistant system 106. Each of the user device 102, the application server 104, and the AI assistant system 106 shown in FIG. 1 can comprise one or more computer devices, such as the computing device 600 of FIG. 6, discussed below. As shown in FIG. 1, the user device 102, the application server 104, and the AI assistant system 106 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the application server 104 and the AI assistant system 106 could each be provided by multiple server devices collectively providing the functionality of the application server 104 and the AI assistant system 106 as described herein. Additionally, other components not shown may also be included within the network environment.

The user device 102 can be a client device on the client-side of operating environment 100, while the application server 104 and the AI assistant system 106 can be on the server-side of operating environment 100. The application server 104 and/or the AI assistant system 106 can each comprise server-side software designed to work in conjunction with client-side software on the user device 102 so as to implement any combination of the features and functionalities discussed in the present disclosure. For instance, the user device 102 can include an application 108 for interacting with the application server 104 and/or the AI assistant system 106. The application 108 can be, for instance, a web browser or a dedicated application for providing functions, such as those described herein. This division of operating environment 100 is provided to illustrate one example of a suitable environment, and there is no requirement for each implementation that any combination of the application server 104 and the AI assistant system 106 remain as separate entities. For instance, in some aspects, the AI assistant system 106 is a part of the application server 104. While the operating environment 100 illustrates a configuration in a networked environment with a separate user device, application server, and AI assistant system, it should be understood that other configurations can be employed in which aspects of the various components are combined.

The user device 102 may comprise any type of computing device capable of use by a user. For example, in one aspect, a user device may be the type of computing device 600 described in relation to FIG. 6 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the application server 104 and/or the AI assistant system 106 via the user device 102.

The application server 104 can be implemented using one or more server devices, one or more platforms with corresponding application programming interfaces, cloud infrastructure, and the like. The application server 104 provides a framework for a web-based application that can be accessed by user devices, such as the user device 102, via the network 110. The application server 104 can support any type of application ranging from simple websites to complex enterprise applications, providing various features and functionalities such as data storage, user authentication, and real-time communication. The application server 104 stores usage data collected through use of the application in a usage data store 112. The usage data can comprise various information and metrics regarding user interactions with the application, such as, for instance, frequency and duration of usage, actions performed, features accessed, errors encountered, and user demographics. As an example to illustrate in the context of web traffic monitoring, usage data may include the number of page views, unique visitors, session durations, referral sources, and popular content accessed on a website. It should be noted that while FIG. 1 shows a configuration using a web-based application, in some aspects, the application can be provided (entirely or in part) on the user device 102.

The AI assistant system 106 provides a conversational AI assistant that generates responses to user queries regarding the application provided by the application server 104 through natural language interaction. The AI assistant system 106 can leverage artificial intelligence and machine learning algorithms to understand user queries, interpret context, and generate responses by accessing relevant information from various sources, including documentation regarding the application and usage data from the usage data store 112.

As shown in FIG. 1, the AI assistant system 106 includes a query preprocessing module 114, a classification module 116, a usage data question module 118, an out of scope question module 120, and a concepts question module 122. The modules/components of the AI assistant system 106 may be in addition to other components that provide further additional functions beyond the features described herein. The AI assistant system 106 can be implemented using one or more server devices, one or more platforms with corresponding application programming interfaces, cloud infrastructure, and the like. While the AI assistant system 106 is shown separate from the application server 104 and the user device 102 in the configuration of FIG. 1, it should be understood that in other configurations, some of the functions of the AI assistant system 106 can be provided on the application server 104 and/or the user device 102. Additionally, in some configurations, one or more of the components of the AI assistant system 106 shown in FIG. 1 can be provided by the user device 102, the application server 104, and/or another location not shown in FIG. 1. The components can be provided by a single entity or multiple entities.

In some aspects, the functions performed by components of the AI assistant system 106 are associated with one or more applications, services, or routines. In particular, such applications, services, or routines may operate on one or more user devices, servers, may be distributed across one or more user devices and servers, or be implemented in the cloud. Moreover, in some aspects, these components of the AI assistant system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

When the AI assistant system 106 receives a user query from a user device, such as the user device 102, the query preprocessing module 114 of the AI assistant system 106 can perform one or more preprocessing operations on the user query to provide an enhanced query. The query preprocessing module 114 can perform any of a variety of different types of query preprocessing. In some configurations, the query preprocessing module 114 obtains the chat history from the current session and/or a previous session between the user and the AI assistant system 106 and merges the chat history with the user query. In some configurations, various query expansion operations can be performed for the user query. Query expansion generally comprises any technique used to reformulate the user query to improve performance of the AI assistant system 106 in generating a response to the user query. By way of example only and not limitation, one or more of the following query expansion processes can be performed on the user query:

Acronym Expansion: This operation expands acronyms or abbreviations to their full forms. For example, expanding "AI" could be expanded to "artificial intelligence" or "ML" could be expanded to "machine learning."

Synonym Expansion: This operation adds synonyms of terms in the user query. For example, a user query with the term "car" could be expanded to include "automobile," "vehicle," or "motor vehicle."

Stemming or Lemmatization: This operation expands the query terms to include their word stems or root forms. For example, "running" could be expanded to include "run," "runs," or "ran."

Word Sense Disambiguation: This operation expands ambiguous terms by considering their context or employing semantic analysis. For example, this could include distinguishing between "apple" (the fruit) and "Apple" (the company).

User queries submitted to the AI assistant system 106 can pose different types of user questions. In some instances, users issue user queries requesting information regarding their usage data, referred to herein as usage data questions. For example, a user could issue a user query such as: "how many page views were there on my website yesterday by males aged 30-40?" In other instances, users issue user queries seeking general information regarding the application, referred to herein as concepts questions. For example, a user could issue a user query such as: "what is the difference between batch and streaming segmentation?" Accordingly, the AI assistant system 106 includes various modules for generating responses to different types of user questions. In the example of FIG. 1, the AI assistant 106 includes a usage data question module 118 for handling usage data questions, a concepts question module 122 for handling concepts questions, and an out of scope question module 120 for handling other types of questions and user input. It should be understood that the modules 118, 120, 122 are provided by way of example only, and the AI assistant system 106 can include modules not shown for handling other specific types of user queries and/or omit some of the modules shown.

The AI assistant system 106 includes a classification module 116 for classifying a user query in order to select an appropriate module 118, 120, 122 for generating a response to the user query. In the example of FIG. 1, the classification module 116 classifies a user query as a usage data question, a concepts question, or an out of scope question. However, it should be understood that in other configurations, the classification module 116 can classify a user query as a different type of question or input.

In some configurations, the classification module 116 comprises a machine learning model trained to classify a user query. By way of example only, the classification module 116 can process a user query through an embedding model and a 2-layer neural network trained for 3-class classification. However, other model architectures could be employed. The machine learning model can be trained using a training dataset that includes labeled user queries—e.g., each user query has been labeled as a usage data question, a concepts question, or an out of scope question.

In accordance with aspects of the present technology, the concepts question module 122 is configured to generate responses to concepts questions by not only providing general information regarding the application but also supplementing that information with usage data when appropriate to facilitate an understanding of the response. This usage data added to a response to a concepts question is referred to herein as contextual usage insights.

As shown in FIG. 1, the concepts question module 122 includes a concepts response component 124 and a contextual usage insights component 126. The concepts response component 124 generates a response that answers the concepts question using documentation regarding the application. There may be a variety of different sources of documentation providing information regarding an application. For instance, the documentation could include user manuals/guides, online help documentation, API documentation, technical documentation, release/version notes, community forums and support channels, knowledge bases, and training materials.

In some aspects, the concepts response component 124 employs a generative model that, given a prompt based on the user query (or an enhanced query after query preprocessing), generates text that answers the concepts question based on the application documentation. The generative model can comprise a language model that includes a set of statistical or probabilistic functions to perform Natural Language Processing (NLP) in order to understand, learn, and/or generate human natural language content. For example, a language model can be a tool that determines the probability of a given sequence of words occurring in a sentence or natural language sequence. Simply put, it can be a model that is trained to predict the next word in a sentence. A language model is called a large language model (LLM) when it is trained on enormous amount of data and/or has a large number of parameters. Some examples of LLMs are GOOGLE's BERT and OpenAI's GPT-3 and GPT-4. These models have capabilities ranging from writing a simple essay to generating complex computer codes—all with limited to no supervision. Accordingly, an LLM can comprise a deep neural network that is very large (billions to hundreds of billions of parameters) and understands, processes, and produces human natural language by being trained on massive amounts of text. These models can predict future words in a sentence letting them generate sentences similar to how humans talk and write.

The generative model used by the concepts response component 124 can comprise a neural network. As used herein, a neural network comprises multiple operational layers, including an input layer and an output layer, as well as any number of hidden layers between the input layer and the output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

As will be described in further detail below with reference to FIG. 3, in some aspects, the concepts response component 124 identifies, from a corpus of application documentation, documentation that is relevant to the user query and provides that documentation to the generative model to generate the text for the response using the documentation. For instance, semantic similarity could be employed in which a query embedding is generated from the user query and used to identify similar document embeddings generated from the application documentation. In further aspects, the concepts response component 124 also performs source attribution by identifying which application documentation was used to generate portions of the response and including references to the documentation in the response.

The contextual usage insights component 126 adds contextual usage data to responses generated by the concepts response component 124. In some aspects, the contextual usage insights component 126 initially determines whether to add contextual usage insights. For instance, in some aspects, a rules-based approach is used in which the usage insights component 126 determines whether to add contextual usage insights based on whether the user query or the response generated by the concepts response component 124 includes text corresponding with a data object for which usage data can be retrieved. Another rule may be based on whether contextual usage data (e.g., for that data object) has been provided in a previous response during the chat session. In further aspects, the contextual usage insights component employs a machine learning model trained to determine whether to add contextual usage insights to responses. The machine learning model could be trained on, for instance, user queries and/or responses labeled with an indication of whether to provide contextual usage insights.

Given a determination to add contextual usage insights, the contextual usage insights component 126 retrieves, from the usage data store 112, usage data relevant to the user query and/or the response generated by the concepts response component 124. As will be described in further detail below with reference to FIG. 3, in some aspects, the contextual usage insights component 126 maintains a list of predefined context questions that relate to the usage data (e.g., "how many schemas are there in the usage data"; "what were the 3 most recently created schemas"; etc.) mapped to queries in the appropriate syntax for retrieving data from the usage data store 112 (e.g., SQL queries). In such configurations, semantic similarity can be used to identify one or more predefined context questions relevant to the user query and/or response, and the queries mapped to those predefined context question(s) can be used to retrieve the appropriate usage data.

The contextual usage insights component 126 leverages a generative model to generate natural language text with the retrieved usage data. In some aspects, the generative model generates text that is added as a separate section to the response generated by the concepts response component 124 to provide a final response. In other aspects, the text is interweaved with portions of the response from the concepts response component 124 to provide the final response.

Figure 2:
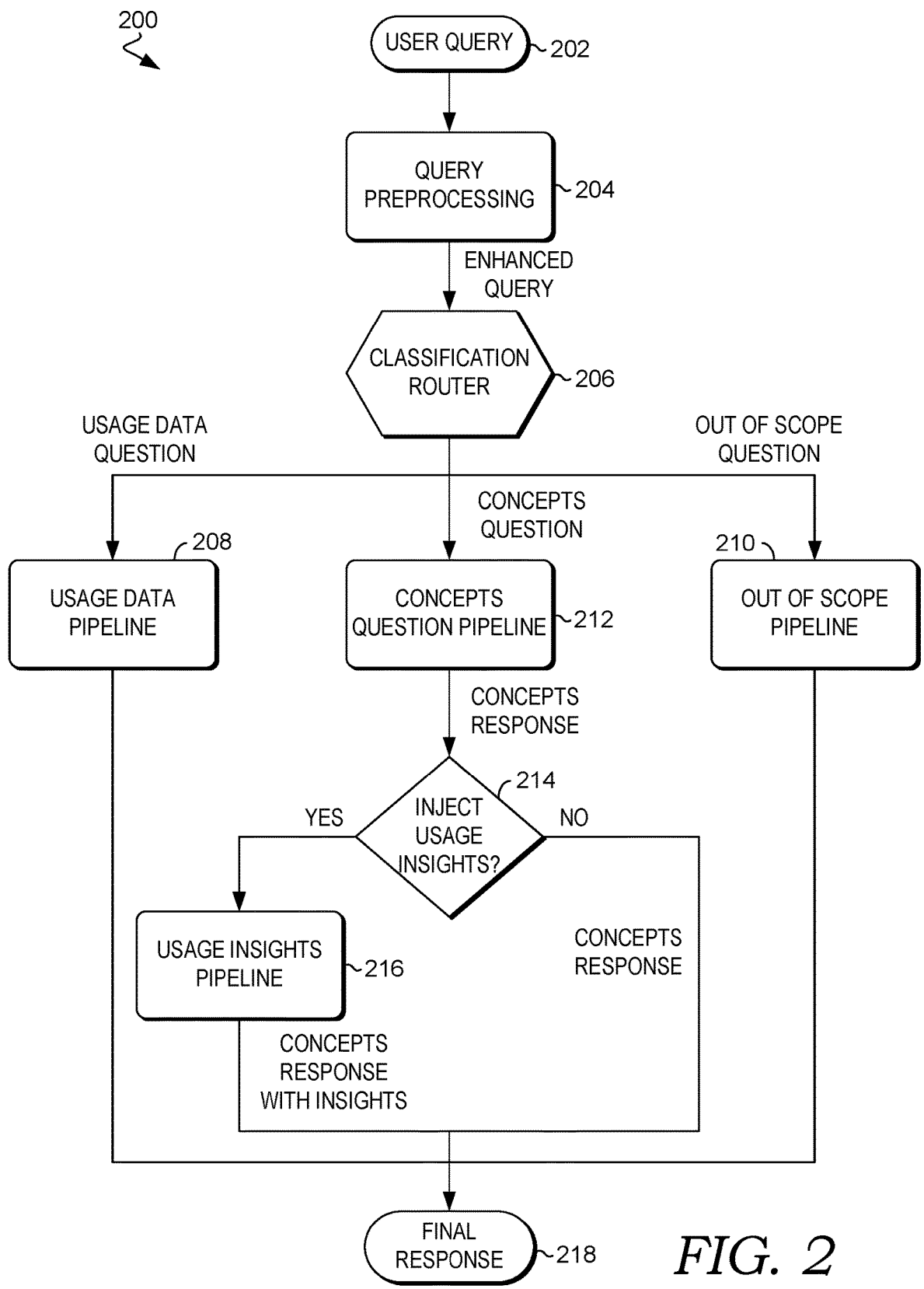
FIG. 2 is a block diagram showing an example process for an AI assistant system generating a response to a user query regarding an application in accordance with some implementations of the present disclosure.

With reference next to FIG. 2, a block diagram is provided showing an example process 200 for generating a response to a user query regarding an application in accordance with one aspect of the present technology. As shown at FIG. 2, a user query 202 is received. The user query 202 may be received as part of a chat session involving interaction between a user via a user device (such as the user device 102 of FIG. 1) and an AI assistant (such as that provided by the AI assistant system 106 of FIG. 1).

One or more query preprocessing operations 204 are performed for the user query 202 to provide an enhanced query. The query preprocessing operations 204 can include, for instance, obtaining a chat history and merging the chat history with the user query. The chat history can comprise information regarding interaction between a user and the AI assistant from the current session, including user inputs and AI assistant responses. In some instances, the chat history can include information from previous sessions between the user and the AI assistant. The query preprocessing operations 204 can further include other query expansion operations, such as, for instance, acronym expansion, synonym expansion, stemming or lemmatization, word sense disambiguation, and the like.

The enhanced query is passed to a classification router 206, which selects a downstream pipeline for processing the enhanced query to generate a response. The classification router 206 selects the downstream pipeline based on the type of question involved. In the configuration of FIG. 2, the classification router identifies the type of question involved as a usage data question, a concepts question, or an out of scope question. The classification route 206 can correspond with the classification module 116 of FIG. 1, and may comprise, for instance, a machine learning model (e.g., a neural network) trained to classify user queries as a usage data question, a concepts question, or an out of scope question.

Based on the classification determined by the classification router 206, the enhanced query is processed by a corresponding pipeline 208, 210, or 212, and a final response 218 is provided as output. For a usage data question, a usage data pipeline 208 processes the enhanced query to generate a response that includes usage data from the application. For an out of scope question, an out of scope pipeline 210 processes the enhanced query by to generate a response. For a concepts question, a concepts question pipeline 212 generates a response based on information from documentation for the application. Additionally, a determination 214 is made regarding whether to inject contextual usage insights into the concepts response. If so, a usage insights pipeline 216 enhances the concepts response from the concepts question pipeline 212 with contextual usage insights based on usage data from the application. If not, the response from the concepts response is not enhanced with contextual usage insights.

Figure 3:
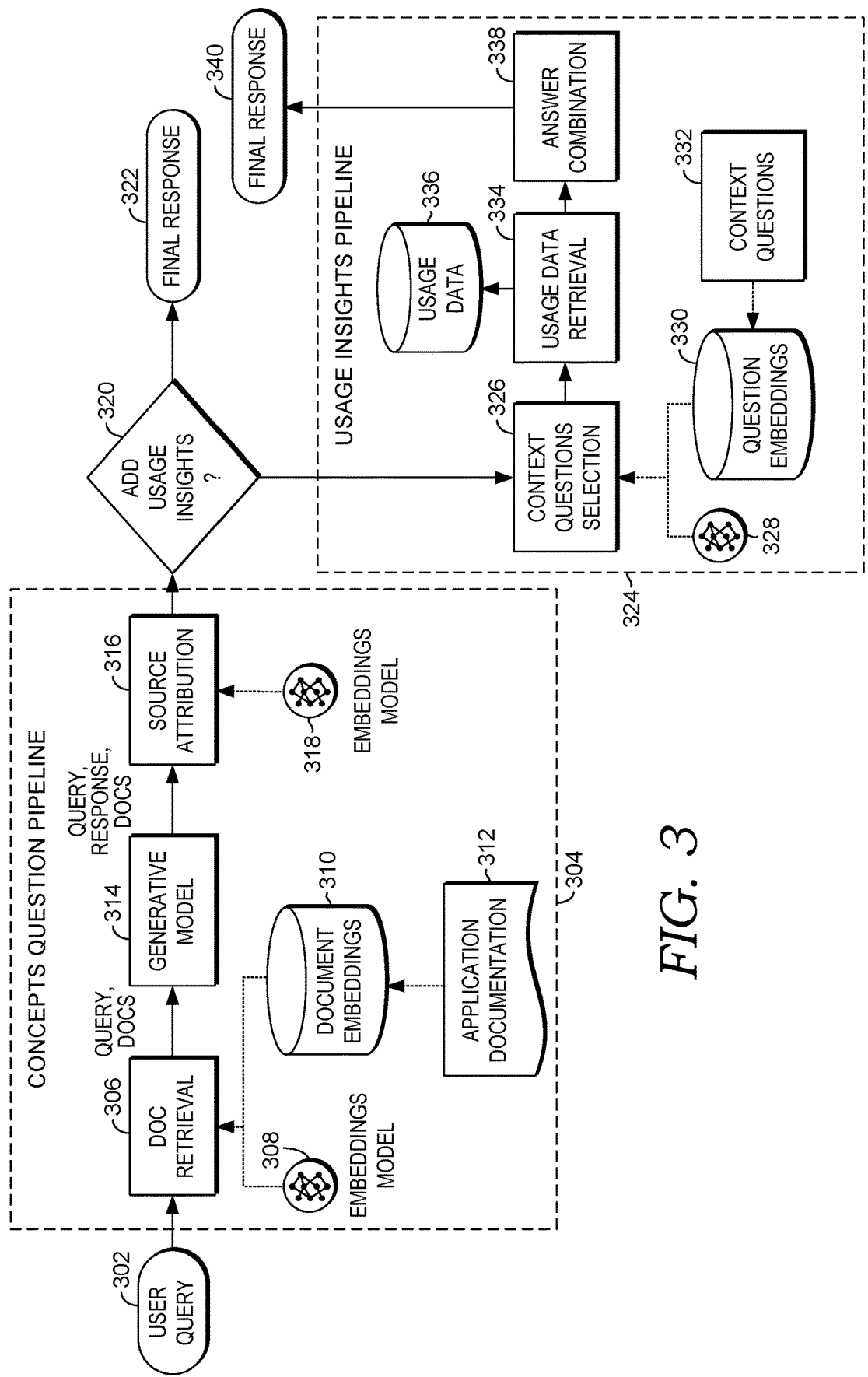
FIG. 3 is a block diagram showing example process for an AI assistant system generating a response to a concepts question regarding an application in accordance with some implementations of the present disclosure.

Turning next to FIG. 3, a block diagram is provided that illustrates an example process 300 for generating a response to a concepts question in accordance with some aspects of the technology described herein. As shown in FIG. 3, a user query 302 is initially processed by a concepts question pipeline 304 to generate a concepts response that answers the concepts question of the user query 304 based on documentation for the application. The user query 302 could comprise an enhanced query after one or more query preprocessing operations. For example, the user query 302 could include a query input by a user enhanced with chat history from the user session, acronym expansion information, and/or other query preprocessing information. In some aspects, the user query 302 is determined to be a concepts question using a classification router, such as the classification router 206 of FIG. 2.

Given the user query 302, document retrieval 304 is performed. In particular, the document retrieval 304 identifies application documentation that is relevant to the user query 302 and can be used for generating a concepts response to the user query 302. The identified documentation can comprise documents and/or document portions (e.g., snippets, phrases, sentences, paragraphs, sections, etc.) from the corpus of documentation available for the application.

In accordance with the configuration of FIG. 3, the document retrieval 304 employs semantic similarity to identify documents/document portions that are relevant to the user query. In particular, the user query 302 is provided to an embedding model 306 that generates a query embedding. The query embedding is used to identify similar document embeddings from a document embedding database 310 (e.g., using cosine similarity). The document embeddings database 310 stores document embeddings generated from documents/document portions from a source of application documentation 312. The document embeddings could be generated using the same embedding model 308 used to generate the query embedding.

In some aspects, the embedding model 308 used to generate query embeddings and/or document embeddings is a neural network model. The embedding model 308 can a pre-trained model, such as a Bidirectional Encoder Representations from Transformers (BERT) model. In other instances, the embedding model 308 can be built and trained from scratch or a pre-trained model that is fine-tuned for the semantic similarity task. For instance, the embedding model 308 could be trained or fine-tuned on a training dataset in which example queries are paired with example documentation, such that for a given user query, the embedding model 308 can retrieve semantically similar documentation.

A generative model 314 generates a concepts response based on the user query and the retrieved documentation. For instance, a prompt could be generated using the user query and the retrieved documentation, and the prompt could be provided to the generative model 314. The prompt could generally instruct the generative model 314 to generate an answer to the user query using the provided documentation.

In the configuration of FIG. 3, the concepts question pipeline 304 performs source attribution 316 in which a determination is made regarding which documentation portions were used to generate different portions of the concepts response generated by the generative model 314. The source attribution 316 employs semantic similarity to identify which of the retrieved documentation portions are semantically similar to portions (e.g., paragraphs, sentences, sentence portions) of the concepts response. In particular, an embeddings model 318 (which could correspond to the embeddings model 308) is used to generate embeddings from portions of the concepts response. Each of those embeddings are then used to identify similar document embeddings for the documentation used by the generative model 314 to generate the concepts response. In some configurations, the source attribution 316 verifies that the concepts response does not include any hallucinations, for instance, by ensuring each portion of the concepts response has a corresponding document embedding with sufficient similarity. In some cases, the source attribution 316 updates the concepts response by adding attributions to the source documentation portions used to generate portions of the concepts response.

A determination is made at 320 regarding whether to add contextual usage insights to the concepts response. In some embodiments, a rules-based approach is used to make the determination. In particular, a determination could be made as to whether the user query, concepts response, and/or source documentation include reference(s) to any data objects in the usage data for which usage data can be queried and returned. In some cases, the determination could also be based on whether the same type of usage data has been provided as contextual usage insights in a previous response in the chat history for the current chat session. In further embodiments, the determination could be made using other approaches, such as leveraging a machine learning model trained to determine whether to add contextual usage insights to a given concepts response.

If the determination is to not add usage insights, a final response 322 comprising the concepts response without any contextual usage insights is provided for output. For instance, the final response 322 can be communicated to a user device for presentation.

Alternatively, if the determination is to add contextual usage insights, the process continues through a usage insights pipeline 324 that adds contextual usage insights to the concepts response from the concepts question pipeline 304. In the usage insights pipeline 324, context question selection 326 is performed to identify one or more context questions that are relevant to the user query and/or the concepts response. A context question comprises a natural language question regarding usage data for the application. In accordance with the configuration of FIG. 3, the context question selection 326 employs semantic similarity to identify relevant context questions. In particular, the user query and/or concepts response are provided to an embedding model 328 that generates a query/response embedding. The query/response embedding is used to identify similar context question embeddings from a context question embeddings database 330 (e.g., using cosine similarity). The context question embeddings database 330 stores context question embeddings generated from a source of context questions 332. The context question embeddings could be generated using the same embedding model 328 used to generate the query/response embedding.

In some aspects, the embedding model 328 used to generate query/response embeddings and/or context question embeddings is a neural network model. The embedding model 328 can a pre-trained model, such as a BERT model. In other instances, the embedding model 328 can be built and trained from scratch or a pre-trained model that is fine-tuned for the semantic similarity task. For instance, the embedding model 328 could be trained or fine-tuned on a training dataset in which example queries/concept responses are paired with example context questions, such that for a given user query/concept response, the embedding model 328 can retrieve semantically similar context questions.

The context question selection 326 selects one or more context questions based on the semantic similarity. For instance, the top N context questions could be selected based on similarity scores or context questions having a similarity score above a threshold could be selected. In some cases, any data objects identified from the user query and/or concepts response could be used in the selection process. For instance, if a single data object is identified from the text of the user query and/or concepts response, only context questions that relate to that data object may be considered.

Based on the one or more selected context questions, querying 334 is performed to retrieve usage data that answers the context question(s). In some configurations, each context question is mapped to a query (e.g., a SQL query) in an appropriate syntax for querying a usage data store 336. Accordingly, for each selected context question, the query mapped to the context question is retrieved from the mapping, and the query is used to retrieve data from the usage data store 336.

Answer combination 338 is performed to add the retrieved usage data to the concepts response as contextual usage insights in order to generate a final response 340, which can be provided to a user device for presentation. In some aspects, the answer combination 338 employs a generative model to generate natural language text using the retrieved usage data. The generative model could interweave the usage data with the text from the concepts response or could include the natural language text with the retrieved usage data as a section separate from the concepts response.

Example Methods for Enhancing AI Responses with Contextual Usage Insights

Figure 4:
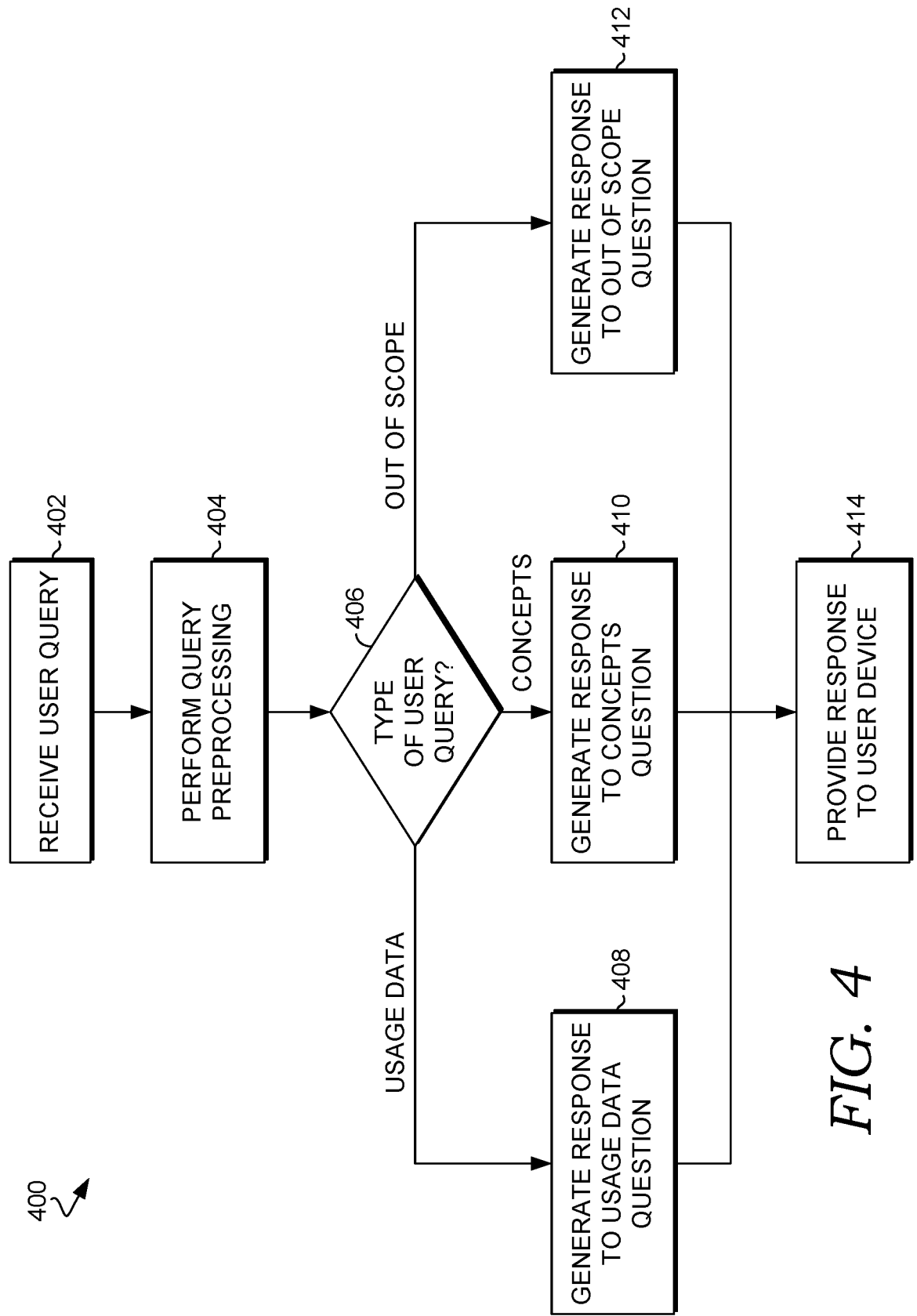
FIG. 4 is a flow diagram showing a method for generating a response to a user query by an AI assistant system in accordance with some implementations of the present disclosure.

With reference now to FIG. 4, a flow diagram is provided that illustrates a method 400 for generating a response to a user query using an AI assistant. The method 400 may be performed, for instance, by the AI assistant system 106 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a user query regarding an application is received. Query preprocessing is performed on the user query, as shown at block 404. The query preprocessing can include merging a chat history with the user query and/or one or more query expansion operations, such as acronym expansion and synonym expansion. The user query is evaluated at block 406 to determine what type of user question the user query presents. For instance, a machine learning model trained to classify user queries could be employed. In the example method of FIG. 4, the user query is classified as a usage data question, a concepts question, or an out of scope question. However, it should be understood that a user query could be identified as another type of user question.

If the user query is determine to be a usage data question, the user query is routed to a usage data question pipeline to generate a response to the usage data question based on usage data for the application, as shown at block 408. If the user query is determined to be a concepts question, the user query is routed to a concepts question pipeline to generate a response to the concepts question based on documentation for the application, as shown at block 410. In some instance, contextual usage insights are added to the concepts response. If the user query is determined to be an out of scope question, the user query is routed to an out of scope question pipeline to generate a response, as shown at block 412. After a response has been generated by one of the pipelines, the response is provided to a user device for presentation, as shown at block 414.

Figure 5:
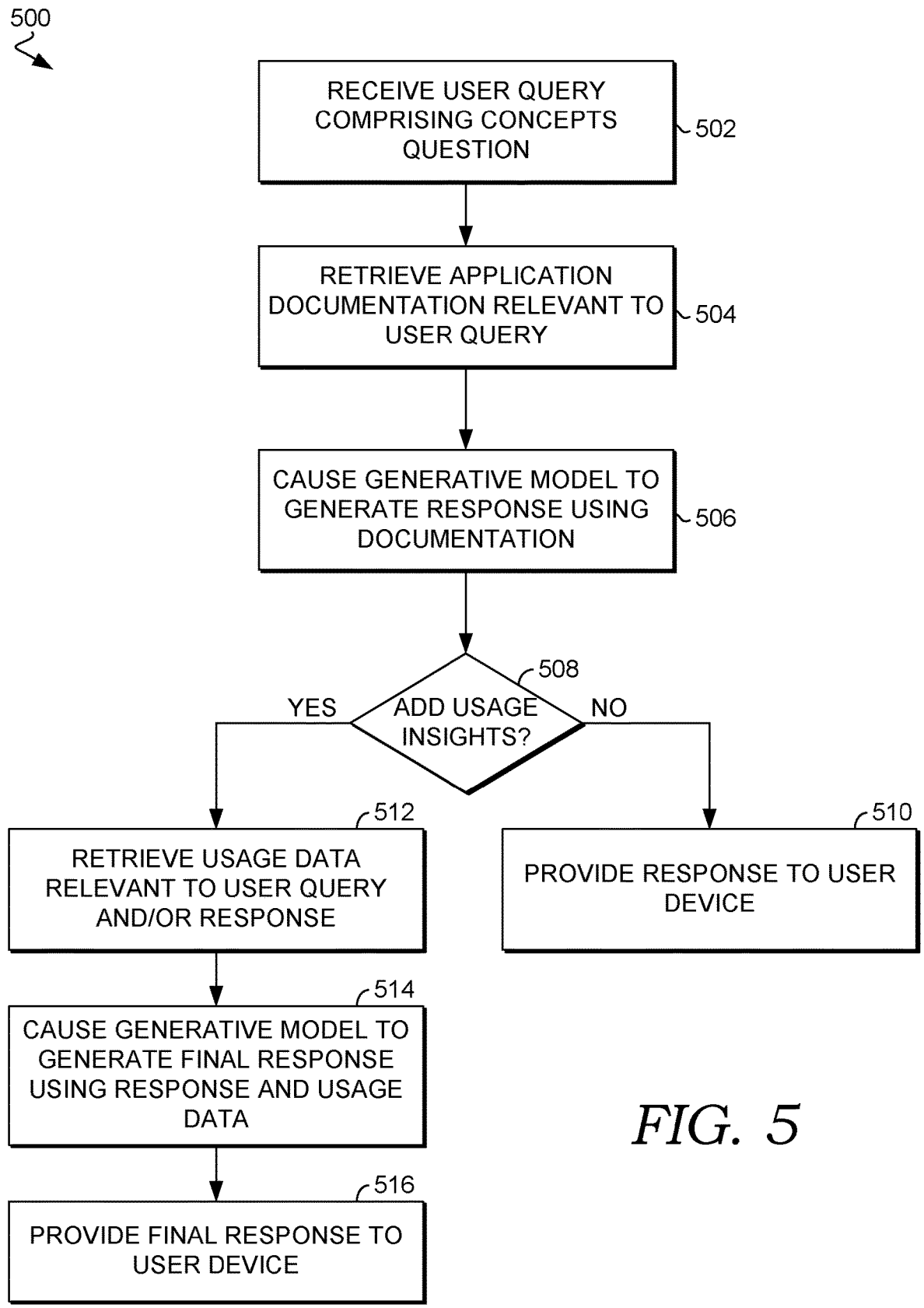
FIG. 5 is a flow diagram showing a method for generating a response to a concepts question by an AI assistant system in accordance with some implementations of the present disclosure.

Turning next to FIG. 5, a flow diagram is provided that illustrates a method 500 for generating a response to a concepts question regarding an application. The method 500 can be performed, for instance, at least in part by the concepts question module 122 of FIG. 1. As shown at block 502, a user query comprising a concepts question is received. The user query could comprise an enhanced query in which one or more preprocessing operations have been performed on a query received from a user query.

Application documentation relevant to the user query is retrieved at block 504. The application documentation comprises any information describing aspects of the application. In some aspects, the application documentation relevant to the user query is identified from a corpus documentation available for the application using semantic similarity. For instance, an embedding model could be used to generate document embeddings of documents/document portions from the corpus of application documentation. The embedding model could also be used to generate a query embedding of the user query, and document embeddings similar to the user query could be identified (e.g., using cosine similarity).

As shown at block 506, a generative model generates a response to the user query using the retrieved documentation. For instance, a prompt could be generated based on the user query and the retrieved documentation that instructs the generative model to generate text for a response to the user query using the documentation. In some aspects, portions of the response are enhanced with attributions to source documentation for each portion.

A determination is made at block 508 regarding whether to add contextual usage insights to the response. In some aspects, a rules-based approach is employed to make the determination. For instance, the text of the user query and/or response could be analyzed to determine whether the text includes reference to a data object of the application for which usage data can be retrieved. In some cases, whether usage data has been provided in a previous response in the chat session may also be considered to ensure the same usage data isn't repeatedly provided to the user. In further aspects, a machine learning model trained to determine whether contextual usage insights should be added to user queries can be used to make the determination.

If it is determined at block 508 to not add contextual usage insights, the response generated to answer the concepts question is provided to the user device for presentation. Alternatively if it is determined at block 508 to add contextual usage insights, usage data relevant to the user query and/or the response is retrieved, as shown at block 512. In some aspects, the usage data is retrieved by using semantic similarity to identify context question(s) relevant to the user query and/or the response generated to answer the concepts question, and one or more queries (e.g., SQL queries) in the appropriate syntax mapped to the context question(s) are used to retrieve usage data from a usage data store. In other aspects, other approaches could be employed to query the usage data store. For instance, in some aspects, a generative model could be used to generate one or more queries in the appropriate syntax given a prompt based on the user query and/or the response.

A generative model generates a final response using the response generated to answer the concepts question and the retrieved usage data, as shown at block 514. The generative model generates natural language text with the usage data. In some instances, the generative model interweaves the generated text containing the usage data with the text generated to answer the concepts question. In other instances, text containing the usage data is added as a separate section with the text generated to answer the concepts question. As shown at block 516, the final response with text answering the concepts question and contextual usage insights is provided to a user device for presentation.

Exemplary Operating Environment

Figure 6:
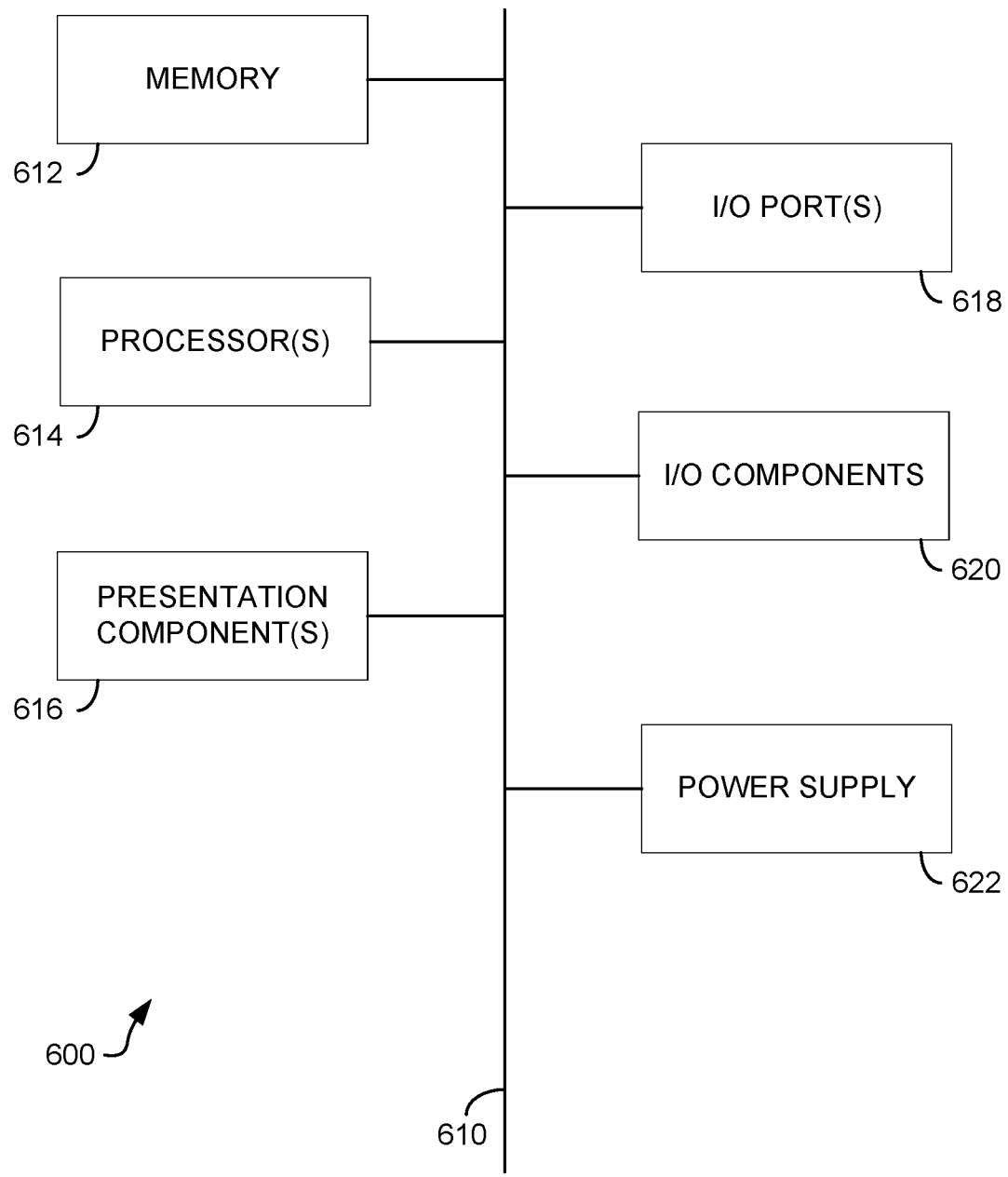
FIG. 6 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology. Neither should the computing device 600 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present technology. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:
    determining a user query comprises a concepts question regarding one or more features of a computer application;
    responsive to determining the user query comprises the concepts question, identifying, from a corpus of documents providing information regarding the computer application, documentation describing the one or more features of the computer application relevant to the concepts question;
    causing a generative model to generate text for a response to the concepts question using the documentation describing the one or more features of the computer application;
    determining to enhance the response by adding contextual usage insights to the response;
    responsive to determining to add contextual usage insights to the response, retrieving usage data generated through use of the computer application, wherein the usage data is selected based on relevance to the user query and/or the response;
    causing the generative model to generate text for an enhanced response using the response and the usage data, wherein the enhanced response is generated by the generative model to include general information regarding the one or more features of the computer application based on the response and at least one contextual usage insight based on the usage data; and
    providing the enhanced response to a user device for presentation.

2. The one or more computer storage media of claim 1, wherein determining the user query comprises the concepts question regarding the one or more features of the computer application comprises:
    providing the user query to a classification model trained to classify user queries as one of a plurality of types of user questions.

3. The one or more computer storage media of claim 1, wherein the user query comprises an enhanced query generated by one or more query preprocessing operations.

4. The one or more computer storage media of claim 1, wherein identifying the documentation describing the one or more features of the application relevant to the concepts question comprises:
    generating, using an embedding model, a query embedding of the user query; and
    identifying one or more document embeddings similar to the query embedding, the one or more document embeddings corresponding to the documentation.

5. The one or more computer storage media of claim 1, wherein determining to enhance the response by adding contextual usage insights to the response comprises:
    identifying text in the user query and/or the response corresponding to one or more known data objects for the computer application.

6. The one or more computer storage media of claim 5, wherein determining to enhance the response by adding contextual usage insights to the response further comprises:
    determining that usage data for the one or more known data objects has not been provided in a previous response in a current chat session.

7. The one or more computer storage media of claim 1, wherein retrieving usage data relevant to the user query and/or the response comprises:
    generating, using an embedding model, an embedding of the user query and/or the response;
    identifying one or more context question embeddings similar to the query embedding, each of the one or more context question embeddings corresponding to a usage data query; and
    retrieving the usage data from a usage data store for the computer application using the one or more usage data queries.

8. The one or more computer storage media of claim 1, wherein the generative model generates the text for the enhanced response using the response and the usage data by intermingling text comprising the usage data with the text of the response.

9. A computer-implemented method comprising:
    determining, by a classification model, that a user query comprises a concepts question regarding one or more features of a computer application;
    responsive to determining the user query comprises the concepts question, identifying, from a corpus of documents providing information regarding the computer application, documentation describing the one or more features of the computer application relevant to the concepts question;
    generating, by a generative model, text for a response to the user query using the documentation describing the one or more features of the computer application;
    determining, by a contextual usage insights component, to enhance the response by adding contextual usage data to the response;
    responsive to determining to add contextual usage data to the response, retrieving, by the contextual usage insights component, usage data generated through use of the computer application, wherein the usage data is selected based on relevance to the user query and/or the response;
    generating, by the generative model, text for an enhanced response using the response and the usage data, wherein the enhanced response is generated by the generative model to include general information regarding the one or more features of the computer application based on the response and at least one contextual usage insight based on the usage data; and providing the enhanced response to a user device for presentation.

10. The computer-implemented method of claim 9, wherein the user query comprises an enhanced query generated by one or more query preprocessing operations.

11. The computer-implemented method of claim 9, wherein the operations further comprise identifying the documentation describing the one or more features of the application by:
generating, using an embedding model, a query embedding of the user query; and
identifying one or more document embeddings similar to the query embedding, the one or more document embeddings corresponding to the documentation.

12. The computer-implemented method of claim 9, wherein determining to enhance the response by adding contextual usage insights to the response comprises:
identifying text in the user query and/or the response corresponding to one or more known data objects for the computer application.

13. The computer-implemented method of claim 12, wherein determining to enhance the response by adding contextual usage insights to the response further comprises:
determining that usage data for the one or more known data objects has not been provided in a previous response in a current chat session.

14. The computer-implemented method of claim 9, wherein retrieving usage data relevant to the user query and/or the response comprises:
generating, using an embedding model, an embedding of the user query and/or the response;
identifying one or more context question embeddings similar to the query embedding, each of the one or more context question embeddings corresponding to a usage data query; and
retrieving the usage data from a usage data store for the computer application using the one or more usage data queries.

15. The computer-implemented method of claim 9, wherein the generative model generates the text for the enhanced response using the response and the usage data by intermingling text comprising the usage data with the text of the response.

16. A computer system comprising:
one or more processors; and
one or more computer storage media storing computer-useable instructions that, when used by the one or more processors, causes the computer system to perform operations comprising:
performing, by a query preprocessing module, one or more preprocessing operations on a user query to provide an enhanced query;
determining, by a classification model, that the enhanced query comprises a concepts question regarding one or more features of a computer application; and
responsive to determining the enhanced query comprises the concepts question, generating, by a concepts response component, a response to the concepts question by:
retrieving, from a corpus of documents providing information regarding the computer application, documentation describing the one or more features of the computer application relevant to the concepts question, and
causing a generative model to generate text for the response using the documentation;
determining, by a contextual usage insights component, to enhance the response by adding contextual usage insights to the response;
responsive to determining to enhance the response by adding contextual usage insights to the response, generating, by the contextual usage insights component, an enhanced response by:
retrieving, from a usage data store for the application, usage data generated through use of the computer application, wherein the usage data is selected based on relevance to the enhanced query and/or the response, and
causing the generative model to generate text for the enhanced response using the response and the usage data, wherein the enhanced response is generated by the generative model to include general information regarding the one or more features of the computer application based on the response and at least one contextual usage insight based on the usage data; and
providing the enhanced response to a user device for presentation.

17. The computer system of claim 16, wherein retrieving documentation describing the one or more features of the computer application relevant to concepts question comprises:
generating, using an embedding model, a query embedding of the user query; and
identifying one or more document embeddings similar to the query embedding, the one or more document embeddings corresponding to the documentation.

18. The computer system of claim 16, wherein determining to enhance the response by adding contextual usage insights to the response comprises:
identifying text in the user query and/or the response corresponding to one or more known data objects for the computer application; and
determining that usage data for the one or more known data objects has not been provided in a previous response in a current chat session.

19. The computer system of claim 16, wherein retrieving the usage data relevant to the enhanced query and/or the response comprises:
generating, using an embedding model, an embedding of the enhanced query and/or the response;
identifying one or more context question embeddings similar to the query embedding, each of the one or more context question embeddings corresponding to a usage data query; and
retrieving the usage data from a usage data store for the computer application using the one or more usage data queries.

20. The computer system of claim 16, wherein the generative model generates the text for the enhanced using the response and the usage data by intermingling text comprising the usage data with the text of the response.

* * * * *